United States Patent
Rahman et al.

(10) Patent No.: US 10,313,504 B2
(45) Date of Patent: Jun. 4, 2019

(54) WIRELESS HANDSFREE HEADSET METHOD AND SYSTEM WITH HANDSFREE APPLICATIONS

(71) Applicants: Hosain Sadequr Rahman, San Francisco, CA (US); Alexander Asseily, San Francisco, CA (US); Darin Rajan, Santa Clara, CA (US)

(72) Inventors: Hosain Sadequr Rahman, San Francisco, CA (US); Alexander Asseily, San Francisco, CA (US); Darin Rajan, Santa Clara, CA (US)

( * ) Notice: Subject to any disclaimer, the term of this patent is extended or adjusted under 35 U.S.C. 154(b) by 0 days.

(21) Appl. No.: 14/519,116

(22) Filed: Oct. 20, 2014

(65) Prior Publication Data

US 2015/0256661 A1     Sep. 10, 2015

Related U.S. Application Data

(63) Continuation of application No. 13/965,127, filed on Aug. 12, 2013, now abandoned, which is a
(Continued)

(51) Int. Cl.
*H04M 1/00*     (2006.01)
*H04M 1/60*     (2006.01)
(Continued)

(52) U.S. Cl.
CPC ........ *H04M 1/6066* (2013.01); *H04B 15/005* (2013.01); *H04M 1/7253* (2013.01);
(Continued)

(58) Field of Classification Search
CPC .......... H04M 1/6066; H04M 2250/02; H04M 2250/74
(Continued)

(56) References Cited

U.S. PATENT DOCUMENTS 6,801,763 B2 *  10/2004  Elsey et al. ................ 455/404.1
7,149,475 B2    12/2006  Kawamura
(Continued)

FOREIGN PATENT DOCUMENTS

WO     2007005199 A2    1/2007
WO     2009091944 A1    7/2009

OTHER PUBLICATIONS

Trinh, Sonny, Non-Final Office action for U.S. Appl. No. 13/965,127 dated Mar. 20, 2014.
(Continued)

*Primary Examiner* — Sonny Trinh

(57) ABSTRACT

Embodiments include method for providing a handsfree service to a user of a wireless, handsfree headset. In an embodiment the method comprises the headset performing service discovery on the audio gateway to determine a method of transferring an application to the audio gateway, wherein the application provides the service, the headset causing the application to be transferred to the audio gateway using a method based on the service discovery; and the audio gateway executing the application, wherein this user issues voice commands that are executed by the audio gateway to provide the service.

8 Claims, 9 Drawing Sheets

Related U.S. Application Data continuation of application No. 13/246,617, filed on Sep. 27, 2011, now Pat. No. 8,509,690, which is a continuation of application No. 12/039,718, filed on Feb. 28, 2008, now Pat. No. 8,055,307.

(60) Provisional application No. 61/022,168, filed on Jan. 18, 2008.

(51) Int. Cl.
    *H04B 15/00*      (2006.01)
    *H04M 1/725*      (2006.01)
    *H04M 3/00*      (2006.01)

(52) U.S. Cl.
    CPC ........ *H04M 3/002* (2013.01); *H04M 2250/02* (2013.01); *H04M 2250/74* (2013.01)

(58) Field of Classification Search
    USPC ....... 455/41.2, 569.1, 418, 419, 550.1, 90.2, 455/422.1, 425
    See application file for complete search history.

(56) References Cited

U.S. PATENT DOCUMENTS

| | | | |
|---|---|---|---|
| 7,292,880 B2 * | 11/2007 | Lehtonen | .................... 455/569.1 |
| 7,647,077 B2 * | 1/2010 | Hui et al. | ...................... 455/570 |
| 7,657,024 B2 | 2/2010 | Huang | |
| 8,055,307 B2 | 11/2011 | Rahman et al. | |
| 8,340,309 B2 * | 12/2012 | Burnett et al. | ................ 381/71.6 |
| 8,452,347 B2 | 5/2013 | Rahman et al. | |
| 8,509,690 B2 | 8/2013 | Rahman et al. | |
| 2003/0040341 A1 | 2/2003 | Casais | |
| 2003/0100274 A1 | 5/2003 | Brown | |
| 2004/0203351 A1 | 10/2004 | Shearer et al. | |
| 2006/0020716 A1 | 1/2006 | Suryanarayana | |
| 2006/0099992 A1 | 5/2006 | Ju | |
| 2007/0004463 A1 | 1/2007 | Clark et al. | |
| 2007/0142040 A1 | 6/2007 | Weinans et al. | |
| 2007/0283033 A1 | 12/2007 | Bloebaum et al. | |
| 2009/0082062 A1 | 3/2009 | Boyaci et al. | |
| 2009/0117890 A1 | 5/2009 | Jacobsen et al. | |
| 2009/0251409 A1 | 10/2009 | Parkinson et al. | |
| 2010/0151788 A1 | 6/2010 | Rahman et al. | |
| 2014/0141842 A1 | 5/2014 | Rahman et al. | |

OTHER PUBLICATIONS

Trinh, Sonny, Non-Final Office action for U.S. Appl. No. 13/246,617 dated Aug. 2, 2012.

Trinh, Sonny, Non-Final Office action for U.S. Appl. No. 12/039,718 dated Nov. 4, 2010.

Young, Lee W., International Searching Authority, Notification of Transmittal of the International Search Report and the Written Opinion of the International Searching Authority, or the Declaration for International Patent Application No. PCT/US2009/031195 dated Feb. 20, 2009.

Jackson, Blane J., Non-Final Office Action for U.S. Appl. No. 12/354,689 dated Jun. 1, 2012.

\* cited by examiner

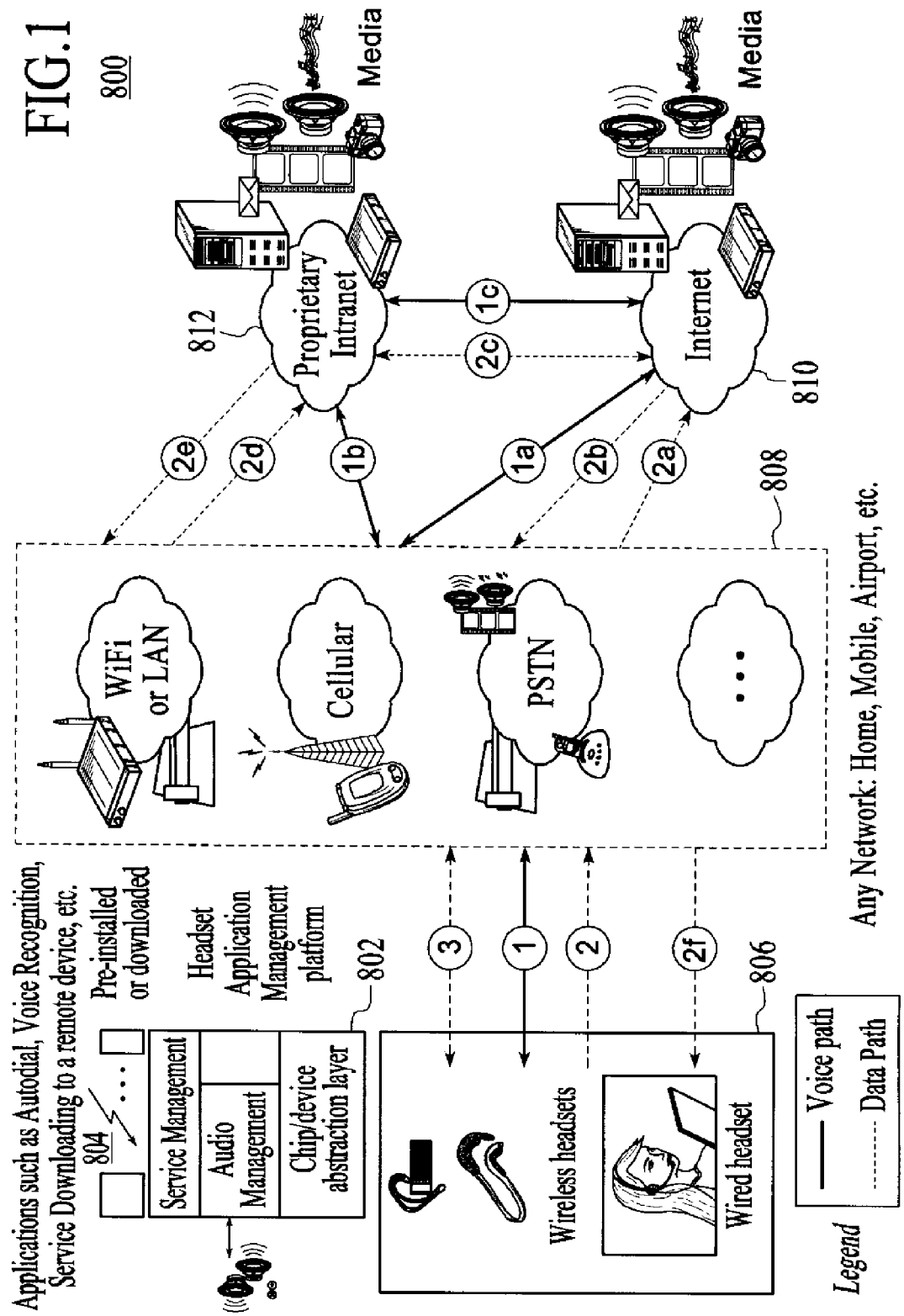

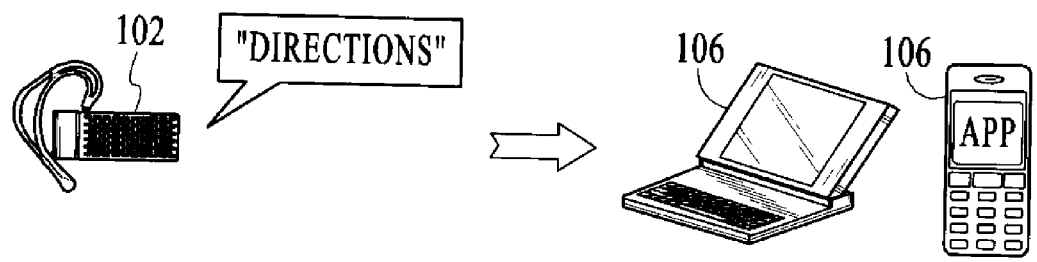
FIG.2C
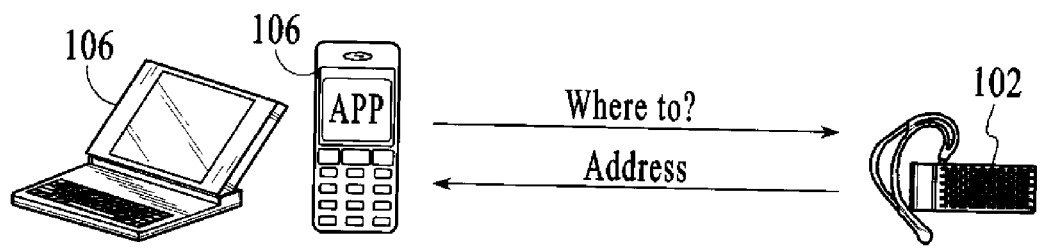
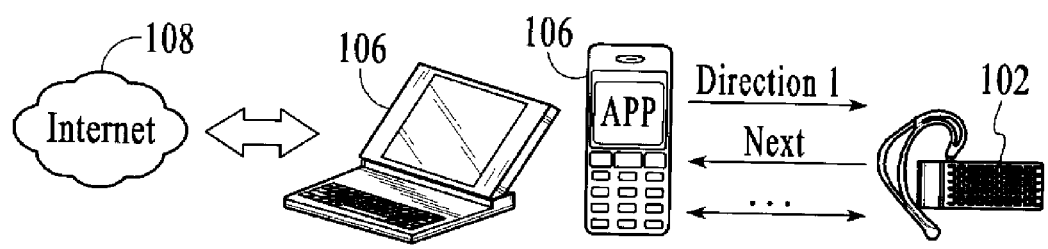
FIG.2D

WIRELESS HANDSFREE HEADSET METHOD AND SYSTEM WITH HANDSFREE APPLICATIONS

CROSS-REFERENCE TO RELATED APPLICATIONS

This application is a continuation of copending U.S. Nonprovisional patent application Ser. No. 13/965,127, filed Aug. 12, 2013, entitled "Wireless Handsfree Headset Method and System with Handsfree Applications," which is a continuation of U.S. Nonprovisional patent application Ser. No. 13/246,617, filed Sep. 27, 2011, now U.S. Pat. No. 8,509,690, entitled "Wireless Handsfree Headset Method and System with Handsfree Applications," which is a continuation of U.S. Nonprovisional patent application Ser. No. 12/039,718, filed Feb. 28, 2008, now U.S. Pat. No. 8,055,307, entitled "Wireless Handsfree Headset Method and System with Handsfree Applications," which claims the benefit of U.S. Provisional Patent Application No. 61/022,168, filed Jan. 18, 2008, entitled, "Wireless Handsfree Headset Method and System with Handsfree Applications," all of which are incorporated by reference herein in their entirety for all purposes.

TECHNICAL FIELD

Embodiments described herein are related to sophisticated wireless headsets that include various software applications and communication technologies.

BACKGROUND

Wireless headsets enhance the experience of the mobile communication device user by allowing handsfree operation. Mobile communication devices can include cellular or satellite phones, personal data assistants (PDA's) with cellular phone capabilities or any other devices using known wireless communication networks. Mobile communication devices will be referred to herein collectively as mobile phones. Wireless headsets allow mobile phone users to talk handsfree once a call is initiated. Typical wireless headsets are controlled by an audio gateway, such as a mobile phone or personal computer (PC). The wireless headset abides by the rules and limitations defined by the software of the audio gateway. The audio gateway is the unit in communication with the wireless communication network being used. Applications available over the network must be accessed using the audio gateway, typically by establishing a connection via the network by using a physical interface of the audio gateway. Once a connection to the application is established, the wireless headset can be used to communicate with the application. This has limitations in that it is a multi-step process to access applications and then interact with them using the wireless headset. It would be desirable to have a headset that includes interfaces to the audio gateway allowing control of data and translation of data to an audio stream that is sent to the headset and heard by the user. It would be desirable to have such a headset that did not require a physical interface to issue commands and receive audio and visual feedback.

BRIEF DESCRIPTION OF THE DRAWINGS

FIG. 1 is a block diagram of a system according to an embodiment.

FIGS. 2A, 2B, 2C, and 2D are block diagrams illustrating a use case of one embodiment.

DETAILED DESCRIPTION

Figure 2A:
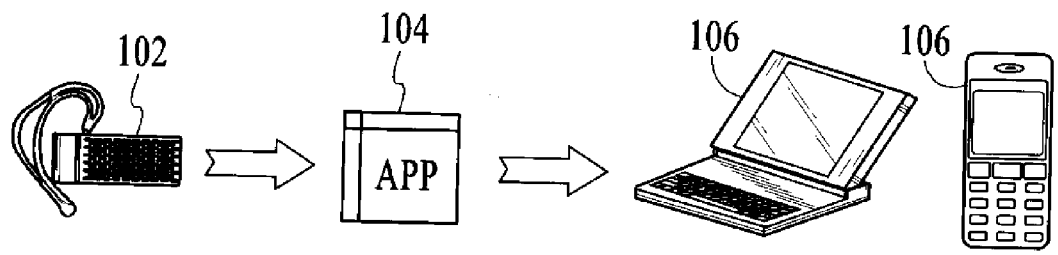

FIG. 1 is a block diagram of a system 800 according to an embodiment. System 800 includes a variety of communications networks 808, which include WiFi networks or local area networks (LAN s), cellular networks, public switched telephone networks (PSTNs), and any other known wired or wireless communications networks. Wireless networks include but are not limited to Bluetooth networks, WiFi networks, WiMAX networks, etc. Headsets 806, which include wireless headsets and wired headsets, communicate through networks 808 with other networks, such as proprietary intranet 812 and Internet 810. A headset application management platform 802, as further described with reference to specific embodiments herein, facilitates the execution of various user applications 804 that provide enhanced functionality and flexibility to the headsets 806. User applications 804 include, but are not limited to, an autodial application, a voice recognition application, and an application for downloading services to remote devices. The headset application management platform 802 includes a chip or device abstraction layer, an audio management layer, and a service management layer.

An example of the operation of the system 800 will now be described with reference to the circled numbers and arrows in the diagram. As shown at 1, a voice command is issued from a headset 806 through a voice gateway to a communications network 808. The voice gateway can either be located on a network 808 or included in a wired or wireless headset 806. A voice gateway may support digitized voice, VoIP or traditional voice services. A voice or data gateway may be comprised of a PC, WiFi Access Point, Cellular phone, Wireless home phone, etc.

Referring to 1a, 1b, and 1c, if the voice command is co-processed by a network 808-based service it may be transported through the Internet or directly to a service of the proprietary network 812. If the service is a voice-based service, voice is returned to the user. An example is a request for streaming music from a back-end library, a music library located in the home, etc.

Another example is a voice-based messaging service. If the voice command is a request for data (from either a back-end service or a service on a co-located network) a data path is established through a data gateway. The data gateway may be included as part of a voice gateway or a separate entity such as a WiFi Access point.

Referring to 2a, 2c, and 2d, a data command is delivered to a back-end server. The data command could be a request for an application or other service. Data commands are not limited to any standard based protocol and may be a proprietary protocol. This includes using the platform to install a protocol that can run over Bluetooth as only a transport, or a standard protocol such as SMS, HTTP, WAP Push, etc. The service could be provided through the Internet 810 or directly to the proprietary network 812.

Referring to 2b, 2e, and 2f, the requested service is returned to the headset 806 through the data network (e.g., the Internet 801 or the proprietary network 812 directly). A data service may be any service that could reside on the headset 806, voice gateway, data gateway, or any other device such as a DVR. The service may also be a service that is shared between the headset 806 and the audio or data gateway, such as headset configuration management or service management. A shared service can be any service that is shared or allows voice-driven command and control of the headset 806 or other device including the voice or data gateway, or home services such as music players, DVRs etc.

The data service can be delivered any device that requires command/control. This could include an applet on the headset 806 alone (such as a voice-driven interface where different languages are requested, a streaming music interface, or to remotely program a DVR, etc). Alternatively an application can be installed on a device to allow the device to directly accept voice-driven commands from the headset 806 or to provide a shared service between the headset 806 and the device (such as using the device to control headset feature and visa-versa).

When wireless communications networks 808 are used, such as the cellular network that may be subject to signal fade, packet or signal loss, a shared service between the headset 806 and the voice or data gateway may be used to buffer the requests and send them as the network 808 becomes available. The headsets 806 can be connected to a voice or data gateway either directly or through a wired interface. Where wireless headsets 806 are used it is assumed that they support multi-pairing or multidevice connection when interfacing with more than one data or voice gateway.

A wired headset 806 may include a handset that is equipped with the data management platform 802. In an embodiment the headset 806 is equipped with a proprietary noise suppression service developed by Aliph, Inc. Aliph's proprietary microphones and Noise Suppression techniques make voice-based services possible in headsets, while other noise suppression headsets have too much voice signal degradation to support such services.

Embodiments described herein include a wireless headset with software application stored in memory. In one embodiment, the wireless headset sends data to an audio gateway for the purpose of retrieving an application to provide the headset with a control schema/interface that normally would not be provided. The headset is provided with interfaces to the audio gateway allowing it to control the access of data and translate it back to an audio stream that is sent to the headset and heard by the user. A physical interface is not required to issue commands and receive feedback. Voice is used to command, control, and navigate functionalities of the headset's server application (on an audio gateway). The audio gateway's headset-server suite processes voice data in order to receive an instruction set (e.g., an application or metadata) from the headset, retrieve the data requested from an external source, and communicate requested data over wireless audio channel(s) to the user.

A wireless, handsfree headset uses two input sources for control. One of the inputs (e.g. physical interaction or press) requires one to use one's hands to physically interact with headset (located on the ear). Another input (e.g. voice) requires one to speak into the microphone of the headset to accomplish tasks or actions. In an embodiment, to eliminate physical interaction, the headset transfers compatible, feature-rich software to the audio gateway so that voice may be used to issue commands for controlling the software that will in turn control the audio gateway.

An aspect of embodiment is a methodology for enabling wireless binary install operations to and from a wireless headset. The wireless headset uses a transport medium such as Bluetooth wireless technology to setup connections for sending and receiving data. The data includes binary, compiled data that can be executed on the audio gateway. The headset acts as a control point when interfacing with other devices such as a mobile cellular phone or a computer. The control point enables the user to create and customize their mobile communication experience by wireless application download service or over-the-air data transfer.

In an embodiment the headset uses Bluetooth wireless technology, and uses data transfer profiles for data exchange from headset to audio gateway, and for controlling the audio gateway. These profiles can be either Object Push Profile (OPP), File Transfer Profile (FTP), Human Interface Device Profile (HID), Personal Area Networking Profile (PAN), and Wireless Application Protocol Bearer (WAPB) Profile. Voice is carried via Hands-Free and Headset Profiles (HFP and HSP). Once both devices are bonded and paired, data and voice channels are both opened concurrently.

In an embodiment the headset uses a wireless transport (e.g. Bluetooth) to discover services, and uses the appropriate negotiation or profile to communicate data and receive capabilities from the audio gateway. The headset stores the capabilities of the audio gateway and continuously "learns" about the device's characteristics and specifications through the application (referred to herein as the server application or the client application) that is loaded on the audio gateway.

Once the server application is loaded on the audio gateway, the audio gateway behaves as a wireless, ultra-portable modem that is in constant data exchange and communication with its primary client, the headset. The headset uses voice commands for control of the audio gateway (via server applet, for example). The application parses and processes the voice commands. Once processed, the voice command is answered with the requesting information, or confirmed (e.g., audio is sent back to headset).

For example a mobile phone goes to the gateway and causes the gateway to act on commands to execute applications such as giving directions, finding a business, etc. One aspect is that the application is always present. As soon as the user speaks, the process of executing the application and communicating with the gateway to provide the service is initiated. A user can be driving and using the headset on which the application is already loaded. When the user says "directions", a confirmation is received and a response such as "where do you want to go?" The user can then state an address, and in return receive a message (or atone) "the directions are here". The user can then say "begin", and a first direction is given to the user. The user can prompt the application for further directions by stating "next". The application acts on key words to provide directions without the user needing to look at the phone at all. In an embodiment, once the application has the address, the directions are acquired by the application from a network (typically the Internet). Acquiring driving directions is just one example of a service that can be delivered in this manner.

FIGS. 2A, 2B, 2e, and 2D are block diagrams illustrating a use case of one embodiment. FIG. 2A shows a case in which an application 104 is stored on a headset The application 104 is transferred from the headset 102 to connected device 106. Connected devices 106 can be any device capable of receiving and executing an application as described herein. For example, a connected device 106 can be a global positioning system (OPS) device or a personal computer (PC), and configuration of the headset 102 is managed by the OPS device or PC. In such a scenario, the application 104 can be a relatively small application that provides a "dashboard" function for headset configuration. Confirmation of configuration changes, etc. can be by audio or visual responses. The application 104 may be downloaded to a device 106 by any of several methods, including radio, wireless or wired Internet, CD, etc. The device 106 has only to be capable of communicating with the headset 102 via a communication protocol that could include Bluetooth, but is not limited to Bluetooth.

In further embodiments described herein, the connected devices are audio gateways, but the invention is not so limited. Audio gateways 106 include personal computers (PCs), mobile phones, or any other devices capable of wireless communication via the known networks and protocols. For example, the application is sent to the gateway using Bluetooth, and service discovery is performed by the headset to determine which protocols are supported, whether the client can actually receive an application, and so on. The headset is thus enabled to gain control of the client audio gateway. For example, the headset 102 may not have a Bluetooth profile to accept applications, but is able to accept text over Bluetooth. The application can be sent via Bluetooth transports. Within Bluetooth transports are multiple protocols. For the case shown, an OBEX protocol (which is an object push profile or OPP) can be used. File transfer protocol (FTP) could also be used.

In an embodiment, one or more of the audio gateways 106 includes improved noise cancellation capability. Inferior audio quality has hampered voice dialing and other voice services in the past. In an embodiment, improved audio quality is coupled with management of voice service requests in an asynchronous manner. For example, small voice requests are stored on the device 106 for delivery at the best possible time (and visa-versa in the network). This reduces packet loss and connection loss when the voice services do not need immediate attention.

Figure 2B:
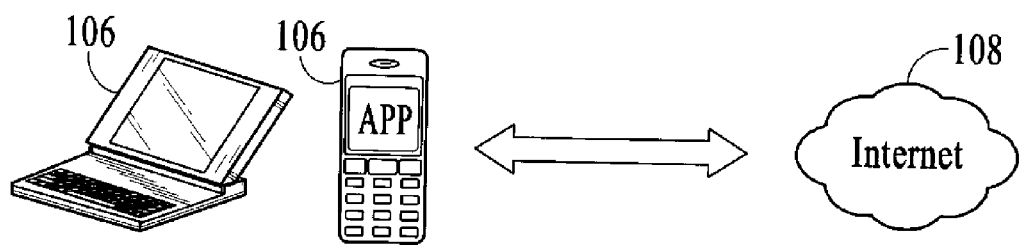

Once the application 104 is stored on an audio gateway 106, it is executed on the audio gateway 106. Audio gateways 106 are also referred to as clients of the headset. The application 104 typically provides a service, so it is assumed that the audio gateway 106 has some connection to the Internet, as shown in FIG. 2B. For example, high speed access to the Internet can include Ethernet in the case of the PC 106.

Once the application 104 has established an Internet connection, the audio gateway 106 can reestablish its connection with the headset 102. Once the headset 102 is aware the connection has been reestablished, it assumes that the connection is successful. At this point the headset 102 is in complete control of the audio gateway 106. For example, the headset 102 user issues a voice direction, which can be a command such as a request for directions, a request for a notepad, an inquiry (such as where is a Chinese restaurant within 10 miles?) or anything that requires the audio gateway 106 to the access the Internet and to provide some sort of service through the headset 102.

FIG. 2C shows an example in which the headset 102 transmits a request for directions to the audio gateway 106. As shown in FIG. 20, once the audio gateway 106 is in direction mode, it is negotiating a handshake with the headset 102. For example, the audio gateway 106 asks "where do you want to go?" and the user can make a voice response via the headset 102.

Figure 3A:
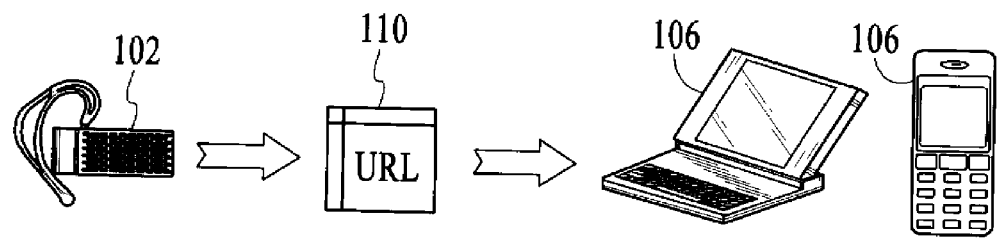
FIGS. 3A, 3B, and 3C are block diagrams illustrating a use case of another embodiment.
Figure 3B:
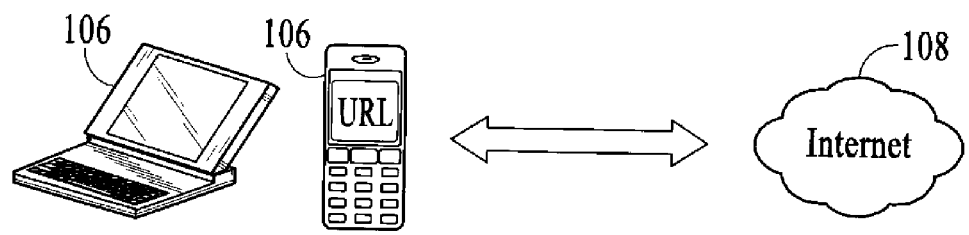
Figure 3C:
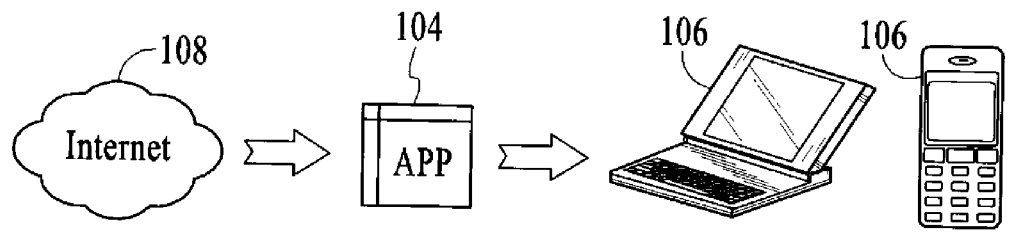

FIGS. 3A, 3B, and 3C are block diagrams illustrating a use case of another embodiment. In this case, the headset 102 sends a uniform resource locator (URL or web address 110) to the audio gateway 106. For example, the application is sent to the gateway using Bluetooth, and service discovery is performed by the headset to determine which protocols are supported, whether the client can actually receive an application, and so on. The headset is thus enabled to gain control of the client. In this case, the headset 102 does not have a Bluetooth profile to accept applications, but it can accept text over Bluetooth. This case can leverage wireless application protocol (WAP). This adds predefined symbols and tags to a string, and is essentially metadata that describes a URL 110. The gateway can understand that it is receiving a URL and that it needs to open up the required Internet connection.

As shown in FIG. 3A, the headset 102 sends a metadata file or URL 110 to the audio gateway 106. The metadata file or URL allows the user to receive the URL and select it, which will take the client to the Internet, as shown in FIG. 3B. The URL is actually the web address for this same application 104, and is a means for accessing the application 104 in this case, and sending the application 104 to the audio gateway as shown in FIG. 3C.

Figure 4A:
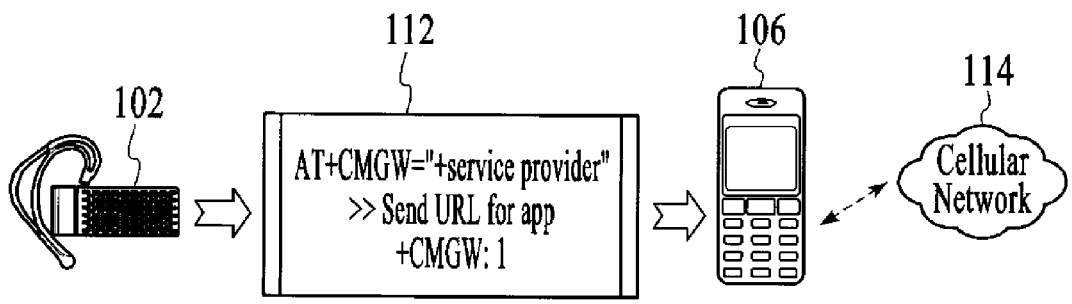
FIGS. 4A, 4B, and 4C are block diagrams illustrating a use case of another embodiment.
Figure 4B:
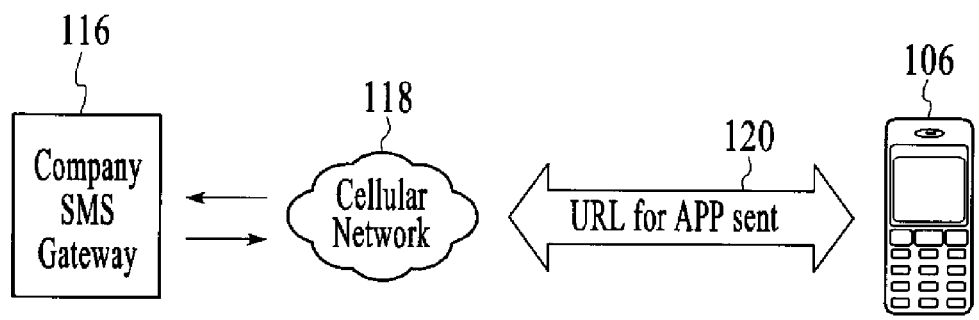
Figure 4C:
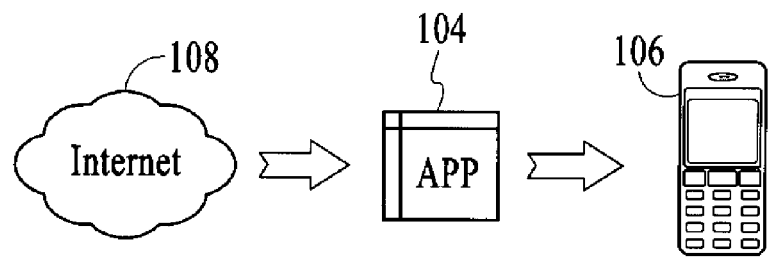

FIGS. 4A, 4B, and 4C are block diagrams illustrating a use case of another embodiment. In this case, short message service (SMS) technology is used to access an application. SMS can use a set of commands called AT commands to send a text message. Referring to FIG. 4A, the headset 102 sends a string 112 that any audio gateway 106 such as a mobile phone is required to parse and execute. So the headset 102 sends an AT command that contains an identification of a service provider. In one embodiment, as shown in FIG. 4B, the service provider includes an SMS gateway 116 set up by the assignee of the current application for example. AT (attention commands) are used in telephony to signal events such call waiting, busy signal, putting a call on hold, etc. AT commands are sent over a cell network by the phone to the network provider. These AT commands can come from anywhere. If the headset sends an AT command to the phone, the phone must act on it and it does so by sending a request to the network provider.

The AT command is sent to the audio gateway 106 and the audio gateway 106 sends the message via a cellular network 118. For example the message may be a URL 120 for an application. The audio gateway 106 sends the text message to a predefined number and the URL 120 for the application is actually a reply from the gateway 116 to the audio gateway 106. The application 104 is then sent via the Internet 108 to the audio gateway 106 (FIG. 4C). This allows the user of the audio gateway 106 to obtain the application 104 that is also stored on the headset if the audio gateway 106 is not able to receive objects over Bluetooth.

Figure 5:
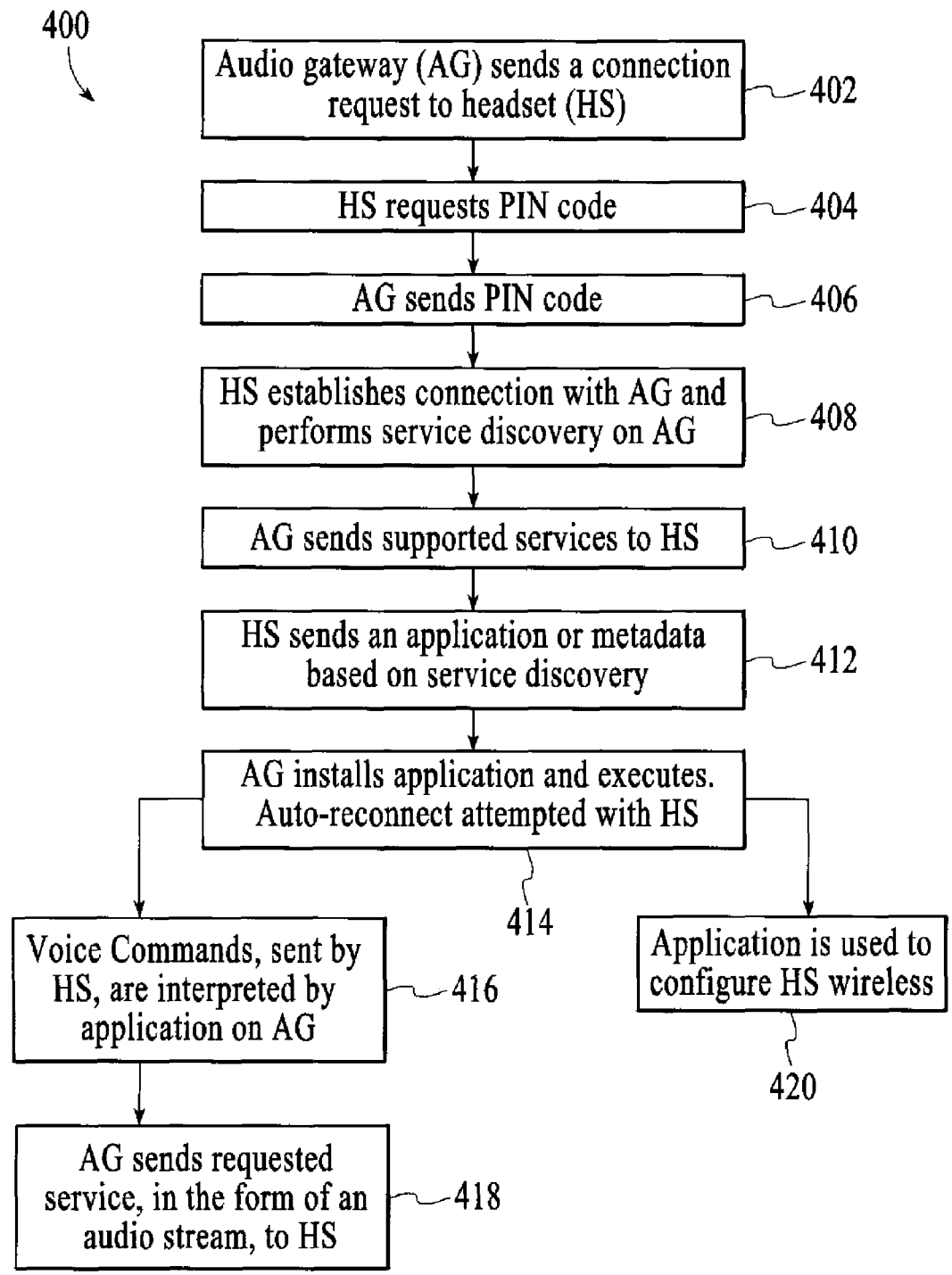
FIG. 5 is a flow chart illustrating a process that includes determining the capabilities of an audio gateway according to an embodiment.

FIG. 5 is a flow chart illustrating a process 400 that includes determining the capabilities of an audio gateway. At 402, the audio gateway sends a connection request to the headset. At 404, the headset requests a PIN code in response. In an embodiment, the PIN code is preprogrammed in the headset. At 406, the audio gateway sends the PIN code to the headset. The headset, at 408, then establishes a connection with the audio gateway and performs service discovery on the audio gateway. Data listing supported services is sent to the headset by the audio gateway at 410. Depending upon what services are supported by the audio gateway, as shown at 412, the headset sends an application to the headset, or alternatively the headset sends metadata such as an AT command or URL (as further illustrated in the use cases of FIGS. 2-4). At 414, the audio gateway installs the application (whether received directly from the headset or not), and executed the application. Upon receipt of the application, the audio gateway automatically attempts to reconnect with the headset (if not already connected).

At this point, one of two processes follows. One process is shown at 416 and 418, where voice commands sent by the headset are interpreted by the application on the audio gateway. For example the commands can include commands to get directions, take down notes, find a business, or anything else that can be communicated to the gateway with a key word that the gateway can act on. In response, the audio gateway sends the requested service in the form of an audio stream to the headset.

Another process is shown at 420, where the application is used to configure the headset. For example, this process can be executed when a user initializes a new headset, in which case an application can customize the headset for language, ringtone, audio tone, etc.

Figure 6:
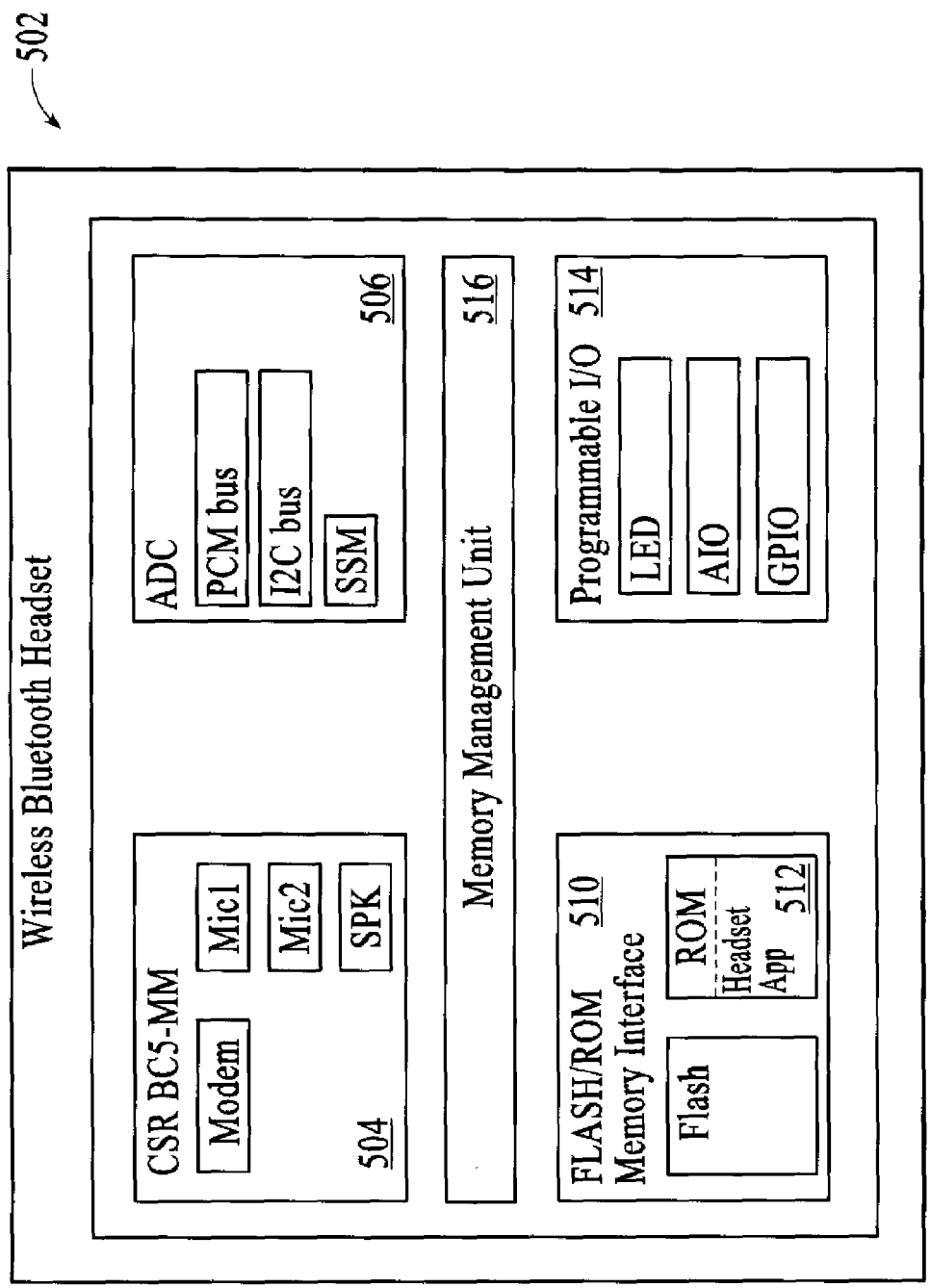
FIG. 6 is a block diagram of various hardware elements of a wireless Bluetooth headset according to an embodiment.

FIG. 6 is a block diagram of various hardware elements of a wireless Bluetooth headset 502 according to an embodiment. The elements include a multimedia chipset 504 including Bluetooth capability. The chipset 504 can be a CSR BC5-MM chipset (as commercially available), but embodiments are not so limited. The chipset 504 includes multiple microphones, a speaker, and a modem. In an embodiment of the headset, there is a dual microphone configuration and an additional skin sensing microphone (also referred to as SSM, shown in ADC 506). In an embodiment, the chipset 504 runs the software stack shown in FIG. 7 and further described below.

The elements of the headset 502 also include an analog to digital converter (ADC) 506 that includes the SSM, a PCM bus and an I2C bus.

A memory management unit (MMU) 516 communicates with a memory interface 510. The memory interface 510 includes flash memory, and ROM memory. In an embodiment, the ROM memory stores the headset applications 512 as previously described herein. The applications 512 communicate with one or more of the profiles 612 as shown and described with reference to FIG. 7. The profiles, in turn, access the applications 512 from the ROM of the memory interface 510.

A programmable input/output (PIO) module 514 includes light emitting diodes (LEOs) on the headset that are controlled or programmed by the by PIO pins. Analog 10 access (AIO) and general purpose 10 (OPIO) are also provided.

Figure 7:
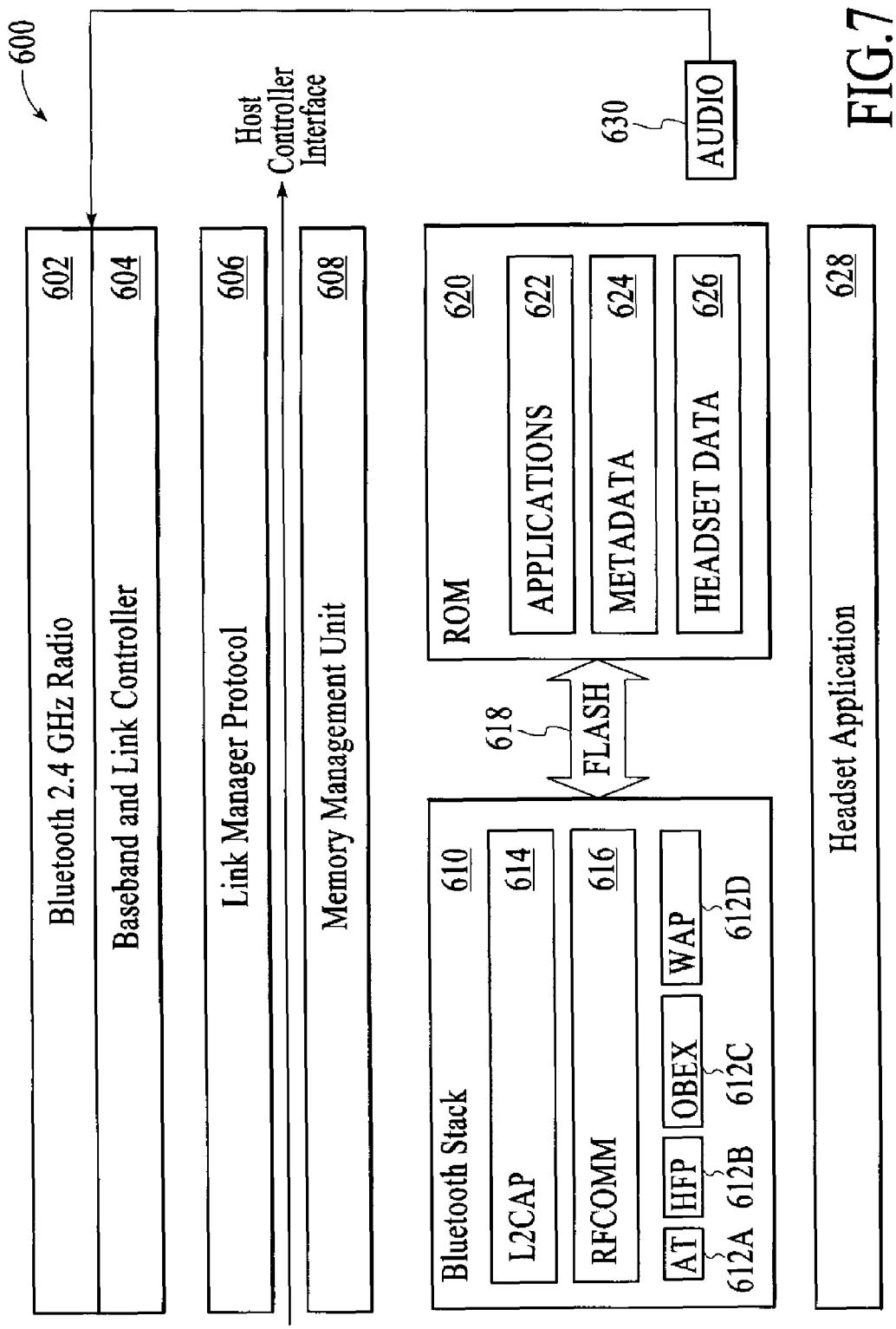
FIG. 7 is a block diagram of an architecture including software components of a headset according to an embodiment.

FIG. 7 is a block diagram of an architecture 600 including software components of a headset according to an embodiment. A Bluetooth radio 602, a Baseband and Link Controller 604, a Link Manager Protocol 606, and an MMU 608 are run by the chipset 504 of FIG. 6. Bluetooth radio 602, and Baseband and Link Controller 604 receive incoming audio 630.

A Bluetooth stack 610 that is proprietary to the headset includes an LCAP module 614, an radio frequency communication (RFCOMM) module 616, and profiles 612. The profiles are used in the various use cases as illustrated in FIGS. 2-4. The profiles include an AT profile 612A, an HFP profile 612B, object OBEX profile 612C, and a wireless application protocol (WAP) profile 6120, but embodiments are not so limited. Any protocols that are usable with Bluetooth transports could have profiles. As examples, the use case of FIG. 2 could use the OBEX profile 612C; the use case of FIG. 2 could use the WAP profile 6120; and use case 3 of FIG. 4 could use the AT profile 612A.

Flash interface 618 is an interface with Flash ROM 620. Flash Rom 620 is where the data to be sent by the headset to gateways or clients is stored. The data includes application 622, metadata 624 and headset data 626.

At the bottom of the architecture 600 is headset application 628. Applications may be "built into the headset" or downloaded to the headset. For example, application can be a set of applications that are downloaded and flashed into the flash ROM of the device. Application 628 may be a pre-installed application in the headset that can leverage the data, metadata or other information that is stored in the flash ROM, including using application 622 to perform its function. An example of this may be a voice recognition application that is pre-installed in the headset, where the application in flash ROM may be extended grammar that can invoke some new function. For example, a function can be added such that a user says "CNN". The grammar to recognize "CCN" may be downloaded over the air to the headset along with the data needed to invoke a data or voice call that results in returning the CCN headlines.

Figure 8:
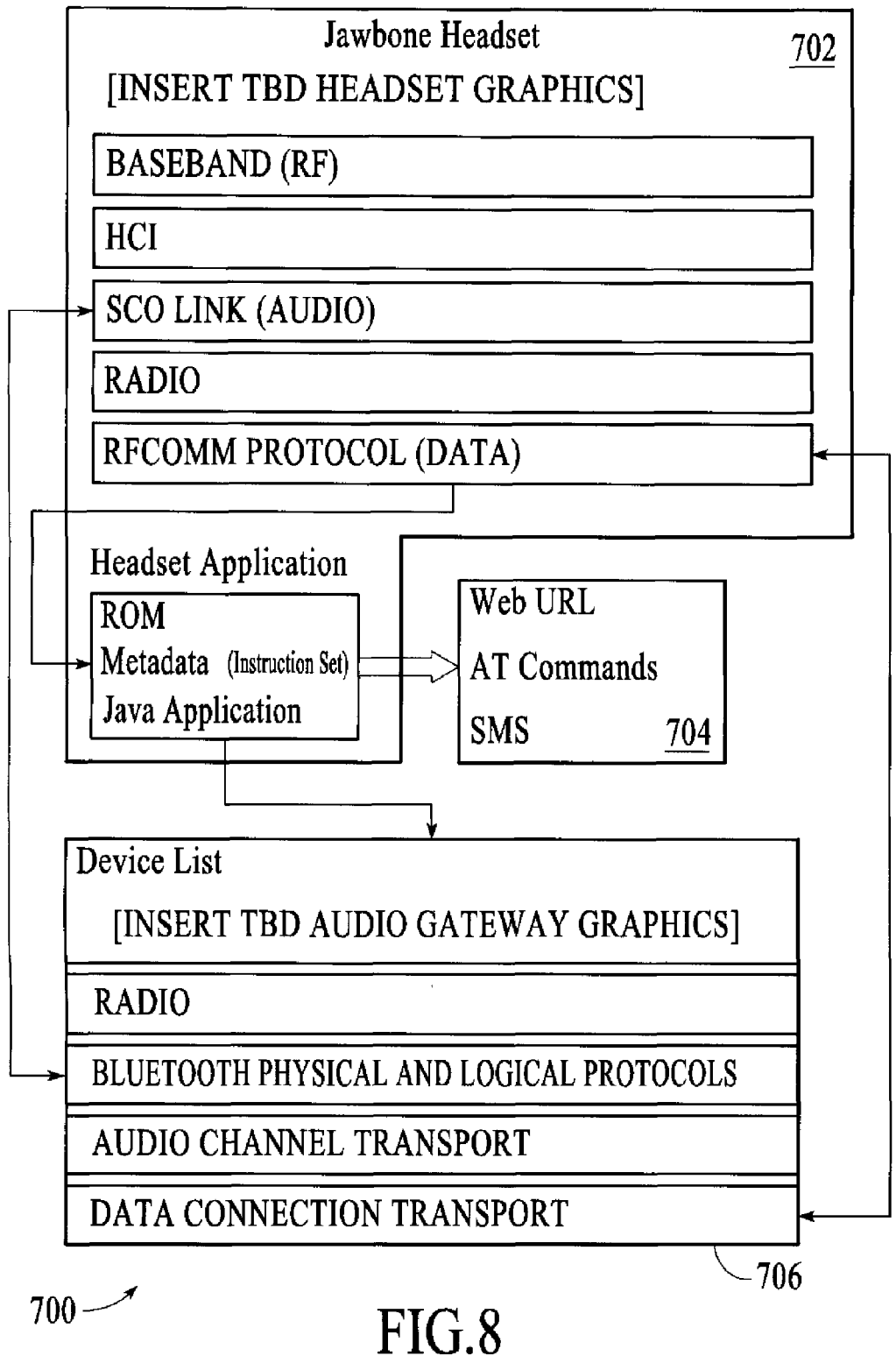
FIG. 8 is a block diagram of a handsfree headset application system according to an embodiment.

FIG. 8 is a block diagram of a hands free headset application system 700 according to an embodiment. The system 700 includes a headset 702, data 704 and a device list 706. The headset 702 includes various communications hardware and software to provide the wireless speaking and listening capabilities required, such as baseband RF, HC!, an SCO link, a radio and RFCOMM protocol data. The headset application is shown stored in a memory device (in this case a ROM) and includes metadata, and a JAVA application. Depending upon the capabilities of the audio gateway, as previously described, the application transfers data 704 including but not limited to a URL, AT commands, or SMS messages to the audio gateway. The device list 706 is a non-exhaustive list of devices including mobile phones, PDAs, etc. that communicate wirelessly using radios, Bluetooth physical and logical protocols, audio channel transport, and data connection transport.

Each of the steps depicted in the flow diagrams presented herein can itself include a sequence of operations that need not be described herein. Those skilled in the relevant art can create routines, algorithms, source code, microcode, program logic arrays or otherwise implement the invention based on the flow diagrams and the detailed description provided herein. The routines described herein can be provided with one or more of the following, or one or more combinations of the following: stored in nonvolatile memory (not shown) that forms part of an associated processor or processors, or implemented using conventional programmed logic arrays or circuit elements, or stored in removable media such as disks, or downloaded from a server and stored locally at a client, or hardwired or preprogrammed in chips such as EEPROM semiconductor chips, application specific integrated circuits (ASICs), or by digital signal processing (DSP) integrated circuits.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other headset systems, not only for the headset system described above. Further, the elements and acts of the various embodiments described above can be combined to provide further embodiments.

Various changes can be made to the invention in light of the above detailed description. In general, in the following claims, the terms used should not be construed to limit the invention to the specific embodiments disclosed in the specification and the claims, but should be construed to include all speech signal systems that operate under the claims to provide a method for procurement. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. Thus, the inventors reserve the right to add additional claims after filing the application to pursue such additional claim forms for other aspects of the invention.

What is claimed is:

1. A device, comprising:
   a headset configured to transfer data with a connected device;
   a microphone configured to receive a signal associated with a voice command;
   an analog-to-digital converter configured to receive the signal from the microphone, and to convert the signal associated with the voice command from an analog format to a digital format;
   a memory configured to store the data associated with the device; and
   a processor configured to determine the service, to receive the signal associated with the voice command in the digital format from the microphone, to identify one or more characters in the digital format of the signal, to transmit the one or more characters to the connected device, to execute a computer program instruction to suppress noise within the signal and another computer program instruction to cancel an echo within the signal, and to receive a request for a connection from the connected device and to provide a code in response to the request.

2. The device of claim 1, wherein the processor is further configured to execute a further computer program instruction to execute calling the service over a data network, the service being configured to initiate a function to be implemented on the headset.

3. The device of claim 1, wherein the processor is further configured to provide a noise suppression function to be performed on the signal.

4. The device of claim 1, wherein the processor is further configured to provide an echo cancellation function to be performed on the signal.

5. The device of claim 1, wherein the processor is further configured to transfer the data with the connected device using a Bluetooth data communication protocol.

6. The device of claim 1, wherein the connected device comprises a mobile device.

7. The device of claim 1, wherein the microphone comprises a dual microphone.

8. The device of claim 1, wherein the microphone comprises a skin sensing microphone.

* * * * *